United States Patent
Calderone et al.

(10) Patent No.: US 12,197,545 B1
(45) Date of Patent: Jan. 14, 2025

(54) SYSTEMS AND METHODS FOR CONVERTING DATA ASSOCIATED WITH A CLINICAL DIGITAL ARTIFACT TO ONE OR MORE MACHINE LEARNING-INFORMED ELECTRONIC COMMUNICATIONS

(71) Applicant: Technology Partners LLC, Charlotte, NC (US)

(72) Inventors: Craig J. Calderone, Bellmore, NY (US); Kareem Malek, Brooklyn, NY (US); Adam I. Kirell, Dix Hills, NY (US)

(73) Assignee: Technology Partners LLC, Charlotte, NC (US)

( * ) Notice: Subject to any disclaimer, the term of this patent is extended or adjusted under 35 U.S.C. 154(b) by 0 days.

(21) Appl. No.: 18/790,910

(22) Filed: Jul. 31, 2024

Related U.S. Application Data

(60) Provisional application No. 63/530,599, filed on Aug. 3, 2023.

(51) Int. Cl.
  *G06F 16/2455* (2019.01)
  *G06F 18/2415* (2023.01)
(52) U.S. Cl.
  CPC .... *G06F 18/2415* (2023.01); *G06F 16/24558* (2019.01)
(58) Field of Classification Search
  None
  See application file for complete search history.

(56) References Cited

U.S. PATENT DOCUMENTS

| | | | | |
|---|---|---|---|---|
| 10,672,251 | B1 * | 6/2020 | Krayer | G06F 16/245 |
| 2004/0027349 | A1 * | 2/2004 | Landau | G06F 16/26 |
| 2014/0297318 | A1 * | 10/2014 | Prasad | G06F 16/24 |
| 2017/0149690 | A1 * | 5/2017 | Le Rudulier | G06F 16/35 |
| 2020/0411170 | A1 * | 12/2020 | Brown | G06F 16/24 |
| 2020/0411171 | A1 * | 12/2020 | Shah | G06F 16/24578 |
| 2021/0057064 | A1 * | 2/2021 | Ballard | G06F 16/908 |
| 2021/0109915 | A1 * | 4/2021 | Godden | G06F 16/2365 |
| 2024/0021313 | A1 * | 1/2024 | Alkaitis | G06F 16/35 |
| 2024/0105298 | A1 * | 3/2024 | Netzer | G06F 16/13 |
| 2024/0312607 | A1 * | 9/2024 | Elidan | G06F 16/90 |

\* cited by examiner

*Primary Examiner* — Son T Hoang
(74) *Attorney, Agent, or Firm* — Padowithz Alce; Quintin Scheitlin; Alce PLLC

(57) ABSTRACT

A computer-implemented method for electronic record classification and machine learning inference(s)-informed automated electronic communication includes obtaining one or more electronic records comprising an unstructured component, the unstructured component comprising a textual representation of a set of instructions; extracting a first set of feature vectors comprising features related to a proposed action instruction, and a second set of feature vectors comprising features related to a proposed temporal instruction; computing a first classification inference and a second classification inference that indicates a likely proposed action instruction type and a likely proposed temporal instruction; generating, by the one or more computer processors, a structured digital artifact accessible via a graphical user interface.

20 Claims, 5 Drawing Sheets

200

Implementing Data Feature Extraction 210

Computing Classification Inferences S220

Constructing Task Instructions S230

Identifying A Communications Scheme S240

Automatically Executing the Communications Scheme S250

SYSTEMS AND METHODS FOR CONVERTING DATA ASSOCIATED WITH A CLINICAL DIGITAL ARTIFACT TO ONE OR MORE MACHINE LEARNING-INFORMED ELECTRONIC COMMUNICATIONS

CROSS-REFERENCE TO RELATED APPLICATIONS

This application claims the benefit of U.S. Provisional Application No. 63/530,599, filed 3 Aug. 2023, which is incorporated herein in its entirety by this reference.

TECHNICAL FIELD

This invention relates generally to the machine learning-based query response generation field, and more specifically, to a new and useful system and method for using machine learning to accelerate a handling of medical digital artifacts.

BACKGROUND

Fast-moving interactions in some medical settings in which a doctor caring for a patient may include generating digital medical artifacts that may include documentation of these interactions in the form of clinical notes. In some cases, clinical notes may include data that inform future needs for various forms of additional patient care or other medical related instructions. However, because there are often deficiencies in an administrative handling of the data within clinical notes, meaningful patient care recommendations may be overlooked or missed altogether thereby leading to a low efficacy in patient care.

Thus, there is a need in the medical digital artifacts handling field to create new and useful systems and methods for implementing machine learning techniques to digitally capture medical care insights from clinical note data and convert medical care insights to automated medical care handling tasks and automatically generate medical care instructions and electronic communications. The embodiments of the present application described herein provide technical solutions that address, at least, the needs described above, as well as the deficiencies of the state of the art.

BRIEF SUMMARY OF THE INVENTION(S)

In some embodiments, a computer-implemented method for electronic record classification and machine learning inference(s)-informed automated electronic communication comprises: at a remote record handling service: obtaining, from a memory device, one or more electronic records comprising an unstructured component, the unstructured component comprising a textual representation of a set of instructions; extracting, by one or more computer processors executing a feature extractor programmed to extract: (a) a first set of feature vectors from the textual representation of the set of instructions, the first set of feature vectors comprising features related to a proposed action instruction, and (b) a second set of feature vectors from the textual representation of the set of instructions, the second set of feature vectors comprising features related to a proposed temporal instruction; computing, by one or more trained machine learning classifiers, a first classification inference that indicates a likely proposed action instruction type of a plurality of action instruction types based on an input of the first set of feature vectors; computing, by the one or more trained machine learning classifiers, a second classification inference that indicates a likely proposed temporal instruction based on an input of the second set of feature vectors; generating, by the one or more computer processors, a structured digital artifact accessible via a graphical user interface based on (1) the first classification inference and (2) the second classification inference, wherein generating the structured digital artifact includes: generating a cell-based container that includes a plurality of distinct cells; automatically inserting one or more action tokens into at least a first cell of the plurality of distinct cells based on the likely proposed action instruction type; automatically inserting one or more temporal tokens into at least a second cell of the plurality of distinct cells based on the likely proposed temporal instruction; and in response to generating the structured digital artifact: obtaining, from a computer database, one or more communication channels based on a record identifier associated with the one or more electronic records; selecting and setting a communication scheme attribute of the structured digital artifact based on the one or more communication channels; and automatically transmitting one or more electronic communications based on the communication scheme attribute of the structured digital artifact.

In some embodiments, the method further includes: computing, by the one or more trained machine learning classifiers, a third classification inference that indicates a likely proposed part involved in the likely proposed action instruction, and generating the structured digital artifact further includes: automatically inserting one or more part tokens into at least a third cell of the plurality of distinct cells based on the likely proposed part involved in the likely proposed action instruction.

In some embodiments, extracting the first set of feature vectors includes extracting tokens, from the textual representation of the set of instructions, that correspond to the proposed action instruction, extracting the second set of feature vectors includes extracting tokens, from the textual representation of the set of instructions, that correspond to the proposed temporal instruction, the cell-based container includes a header area, and generating the structured digital artifact further includes: generating header text based on the tokens that correspond to the proposed action instruction and the tokens that correspond to the proposed temporal instruction, and automatically inserting the header text into the header area based on tokens.

In some embodiments, the computer-implemented method further includes: computing, by the one or more trained machine learning classifiers, a third classification inference that indicates whether the proposed action instruction is a conditional action instruction, and generating the structured digital artifact further includes: automatically inserting one or more Boolean tokens into at least a third cell of the plurality of distinct cells based on whether the proposed action corresponds to the conditional action instruction.

In some embodiments, the computer-implemented method further includes: displaying a second graphical user interface comprising: a matrix that includes entries corresponding to a plurality of structured digital artifacts, including an entry corresponding to the structured digital artifact; detecting a selection of the entry corresponding to the structured digital artifact; and based on detecting the selection of the entry corresponding to the structured digital artifact, displaying the structured digital artifact by overlaying the graphical user interface over the second graphical user interface.

In some embodiments, the entries included in the matrix correspond to a first binning category. In some embodiments, the method further includes: automatically monitoring for changes to a status of the structured digital artifact, while automatically monitoring for the changes to the status of the structured digital artifact, detecting that the status of the structured digital artifact changed from a status associated with the first binning category to a status associated with a second binning category, and visually moving, in the second graphical user interface, the structured digital artifact from being associated with the first binning category to being associated with the second binning category.

In some embodiments, the second graphical user interface further comprises a plurality of selectable binning categories, and the method further includes: detecting a selection of a respective binning category of the plurality of selectable binning categories; and based on detecting the selection of the respective binning category, updating the matrix to include a new set of entries, wherein the new set of entries correspond to a plurality of structured digital artifacts that relate to the respective binning category.

In some embodiments, selecting and setting the communication scheme attribute of the structured digital artifact includes: searching for a lookup entry in a lookup data structure that lists optimal communication channels for the likely proposed action instruction type and the likely proposed temporal instruction, extracting the optimal communication channels from the lookup entry, determining that the one or more communication channels comprise a first communication channel that is included in the optimal communication channels and a second communication channel that is not included in the optimal communication channels, adding the first communication channel to a communication preference parameter of the communication scheme attribute, and forgoing adding the second communication channel to the communication preference parameter of the communication scheme attribute.

In some embodiments, the lookup entry further lists an optimal communication frequency for the optimal communication channels, and setting the communication scheme attribute of the structured digital artifact further includes: setting a communication frequency parameter of the communication scheme attribute to correspond to the optimal communication frequency.

In some embodiments, the one or more communication channels obtained from the computer database have been activated by a user associated with the record identifier, the communication scheme attribute is further selected and set based on the likely proposed action instruction type and the likely proposed temporal instruction, and automatically transmitting the one or more electronic communications based on the communication scheme attribute of the structured digital artifact includes: automatically transmitting the one or more electronic communications based on a communication frequency property of the communication scheme attribute.

In some embodiments, the textual representation of the set of instructions includes: a textual representation of the proposed action instruction, and a textual representation of the proposed temporal instruction, wherein the proposed temporal instruction specifies a timeframe that the proposed action instruction is to be completed.

In some embodiments, the features related to the proposed action instruction include: features that support the one or more trained machine learning classifiers in determining whether the one or more electronic records include at least one proposed action instruction, features that support the one or more trained machine learning classifiers in determining the likely proposed action instruction type, features that support the one or more trained machine learning classifiers in determining whether the proposed action instruction is a conditional action instruction, and features that support the one or more trained machine learning classifiers in determining whether the proposed action instruction is a negated action instruction.

In some embodiments, the features related to the proposed temporal instructions include features that support the one or more trained machine learning classifiers in determining a timeframe that the proposed action instruction is to be completed.

In some embodiments, the computer-implemented method further includes: computing, via a binary classification model, a binary classification inference that indicates whether the one or more electronic records includes at least one proposed action instruction, and based on determining that the binary classification inference indicates that the one or more electronic records includes the at least one proposed action instruction: routing the first set of feature vectors and the second set of feature vectors to the one or more trained machine learning classifiers, and computing, by the one or more trained machine learning classifiers, the first classification inference and the second classification inference based on the input of the first set of feature vectors and the second set of feature vectors.

In some embodiments, the computer-implemented method further includes: based on determining that the binary classification inference indicates that the one or more electronic records do not include the at least one proposed action instruction: forgoing computing, by the one or more trained machine learning classifiers, the first classification inference and the second classification inference.

In some embodiments, generating the structured digital artifact further includes: generating a text input field, and automatically inserting the textual representation of the set of instructions into the text input field, and the plurality of distinct cells are responsive to user input.

In some embodiments, the textual representation of the set of instructions corresponds to narrative text written by an author of the one or more electronic records, and the narrative text describes one or more actions recommended by the author of the one or more electronic records.

In some embodiments, a computer-program product embodied in a non-transitory machine-readable storage medium storing computer instructions that, when executed by one or more processors, perform operations comprising: at a remote service: obtaining, from a memory device, one or more electronic records comprising an unstructured component, the unstructured component comprising a textual representation of a set of instructions; extracting, by a feature extractor programmed to extract: (a) a first set of feature vectors from the textual representation of the set of instructions, the first set of feature vectors comprising features related to a proposed action instruction, and (b) a second set of feature vectors from the textual representation of the set of instructions, the second set of feature vectors comprising features related to a proposed temporal instruction; computing, by one or more trained machine learning classifiers, a first classification inference that indicates a likely proposed action instruction type of a plurality of action instruction types based on an input of the first set of feature vectors; computing, by the one or more trained machine learning classifiers, a second classification inference that indicates a likely proposed temporal instruction based on an input of the second set of feature vectors;

generating a structured digital artifact accessible via a graphical user interface based on (1) the first classification inference and (2) the second classification inference, wherein generating the structured digital artifact includes: generating a cell-based container that includes a plurality of distinct cells; automatically inserting one or more action tokens into at least a first cell of the plurality of distinct cells based on the likely proposed action instruction type; automatically inserting one or more temporal tokens into at least a second cell of the plurality of distinct cells based on the likely proposed temporal instruction; and in response to generating the structured digital artifact: obtaining, from a computer database, one or more communication channels based on a record identifier associated with the one or more electronic records; selecting and setting a communication scheme attribute of the structured digital artifact based on the one or more communication channels; and automatically transmitting one or more electronic communications based on the communication scheme attribute of the structured digital artifact.

In some embodiments, a computer-implemented system comprises: one or more processors; a memory; a computer-readable medium operably coupled to the one or more processors, the computer-readable medium having computer-readable instructions stored thereon that, when executed by the one or more processors, cause a computing device to perform operations comprising: at a remote service: obtaining, from the memory, one or more electronic records comprising an unstructured component, the unstructured component comprising a textual representation of a set of instructions; extracting, by a feature extractor programmed to extract: (a) a first set of feature vectors from the textual representation of the set of instructions, the first set of feature vectors comprising features related to a proposed action instruction, and (b) a second set of feature vectors from the textual representation of the set of instructions, the second set of feature vectors comprising features related to a proposed temporal instruction; computing, by one or more trained machine learning classifiers, a first classification inference that indicates a likely proposed action instruction type of a plurality of action instruction types based on an input of the first set of feature vectors; computing, by the one or more trained machine learning classifiers, a second classification inference that indicates a likely proposed temporal instruction based on an input of the second set of feature vectors; generating a structured digital artifact accessible via a graphical user interface based on (1) the first classification inference and (2) the second classification inference, wherein generating the structured digital artifact includes: generating a cell-based container that includes a plurality of distinct cells; automatically inserting one or more action tokens into at least a first cell of the plurality of distinct cells based on the likely proposed action instruction type; automatically inserting one or more temporal tokens into at least a second cell of the plurality of distinct cells based on the likely proposed temporal instruction; and in response to generating the structured digital artifact: obtaining, from a computer database, one or more communication channels based on a record identifier associated with the one or more electronic records; selecting and setting a communication scheme attribute of the structured digital artifact based on the one or more communication channels; and automatically transmitting one or more electronic communications based on the communication scheme attribute of the structured digital artifact.

In some embodiments, selecting and setting the communication scheme attribute of the structured digital artifact includes: searching for a lookup entry in a lookup data structure that lists optimal communication channels for the likely proposed action instruction type and the likely proposed temporal instruction, extracting the optimal communication channels from the lookup entry, determining that the one or more communication channels comprise a first communication channel that is included in the optimal communication channels and a second communication channel that is not included in the optimal communication channels, adding the first communication channel to a communication preference parameter of the communication scheme attribute, and forgoing adding the second communication channel to the communication preference parameter of the communication scheme attribute.

BRIEF DESCRIPTION OF THE FIGURES

FIG. 2 illustrates an example method 200 in accordance with one or more embodiments of the present application;

FIGS. 4 and 5 illustrate example graphical user interfaces for presenting and accessing a structured digital artifact in accordance with one or more embodiments of the present application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
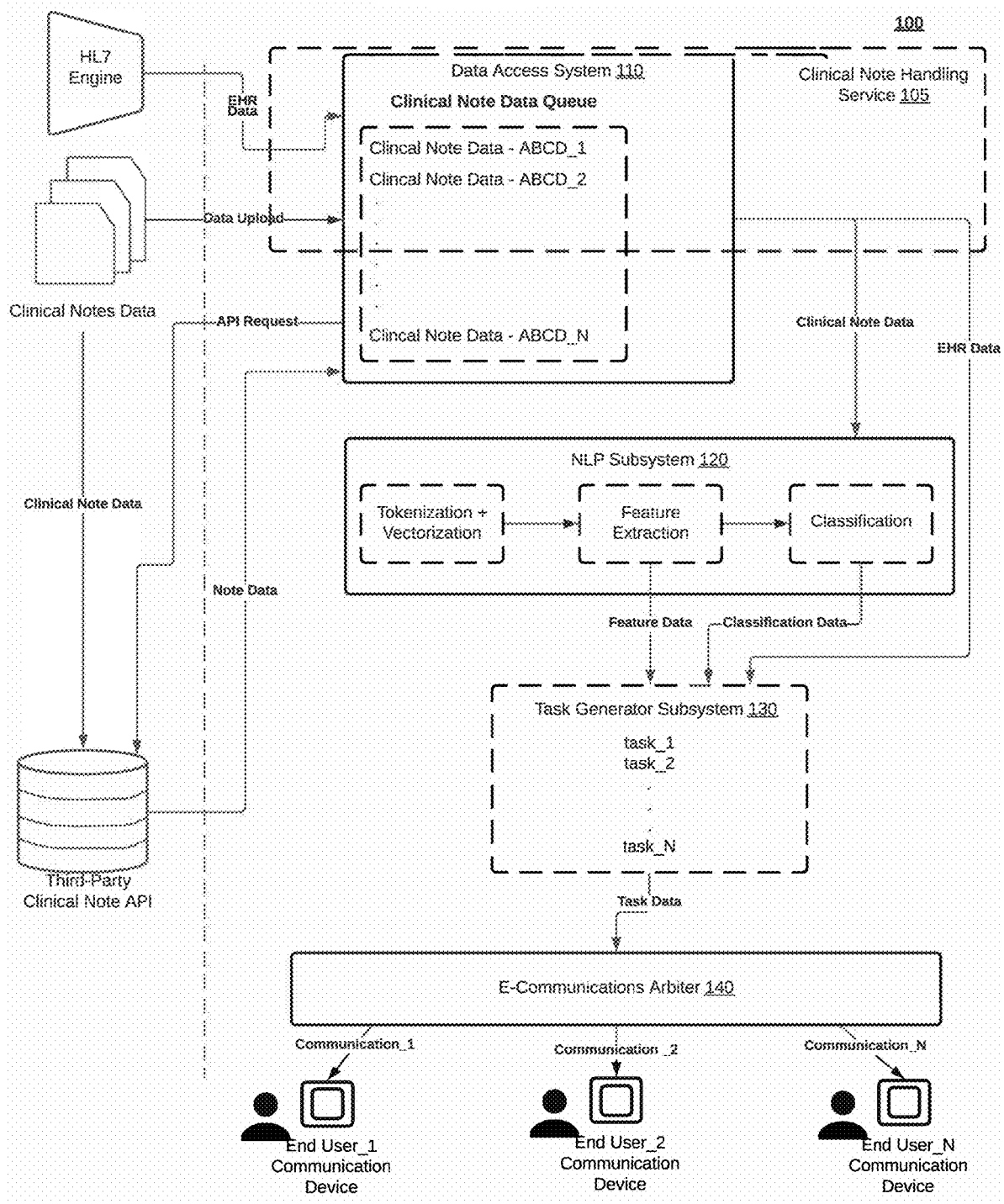
FIG. 1 illustrates a schematic representation of a system 100 in accordance with one or more embodiments of the present application.

1. System for Clinical Note Data Classification and Machine Learning Inference(s)-Informed Automated Routing of Electronic Communications As shown in FIG. 1, a system 100 that implements clinical note data classification and uses machine learning inferences to inform an automated routing of electronic communications includes a clinical note data access and intake subsystem 110, feature extraction and classification subsystem 120, automated task generation subsystem 130, and an electronic communications subsystem 140.

1.05 Clinical Note Data Handling and Automated Electronic Communications Service The clinical note data handling and automated electronic communications service 105 implementing the system 100, sometimes referred to herein as the "clinical note handling service 105" may be implemented by a distributed network of computers (e.g., hosted on the cloud, etc.) and may be in operable and control communication with each of the subsystems of the system 100 and/or third-party subsystems and services. That is, the clinical note handling service 105 may include a centralized controlling computer server(s) and associated computing systems that encourages and/or controls the intelligent and accelerated clinical note data handling, clinical note data classification, and clinical note data-informed communications routing operations of each of the subsystems, described herein, (e.g., subsystems 110-140).

1.1 Clinical Note Data Access+Intake Subsystem

The clinical note data access and intake subsystem 110, which may be sometimes referred to herein as the "data access system" 110, preferably functions to enable one or more electronic connections between the system 100 and one or more external systems of one or more subscribers to the clinical note handling service 105. The data access subsystem 110 may include one or more access modules that may function to establish or create content communication channels, which are sometimes referred to as "data handling nexus," between the system 100 and systems associated with subscribers to the service 105. In one or more embodiments, the data handling nexus may include any suitable medium and/or method of transmitting digital items between at least two devices including, but not limited to, a service bus, a digital communication channel or line, and/or the like.

Additionally, or alternatively, the clinical note data access and intake subsystem 110 may provide a web-based graphical user interface or web application that may enable one or more subscribers to upload clinical note data (e.g., clinical note CSV files, and/or the like) directly into the system 100. Updating clinical note data via a CSV file and/or the like may enable system 100 to ingest historical clinical note data, thereby allowing system 100 to identify recommendations given prior to a live implementation of system 100.

In one or more embodiments, based on accessing or receiving clinical note data, the data access system 110 may function to store the clinical note data in a queue and preferably generate and/or associate identifying metadata including, but not limited to, a session identifier providing a unique identification value for a clinical session associated with a target clinical note, a patient identifier, a doctor identifier, a clinical note identifier, and/or the like. In such embodiments, the identifying metadata may be passed along with the clinical note data to one or more downstream subsystems (e.g., subsystem 120, subsystem 130, subsystem 140) to enable processing, tracking, account identification, and/or the like.

In one or more embodiments, the clinical note data handling service 105 may function to implement a clinical note data handling application programming interface (API) that enables programmatic communication, access, and control between the system 100 and the one or more sub-services within the system 100 and one or more (third-party) APIs associated with one or more subscribers to the clinical note data handling service 105.

Additionally, or alternatively, the data access system 110 may receive the clinical notes data via a health level seven (HL7) interface. In such embodiments, an electronic health record (EHR) system associated with a subscriber may periodically or in real-time send one or more HL7 messages comprising clinical note data to the data access system 110. In turn, the data access system 110 may receive the one or more HL7 messages via a secure channel (e.g., port) of the clinical note handling service 105 and provide the one or more HL7 messages to the NLP subsystem 120.

1.2 NLP: Feature Identification+Extraction and Classification Subsystem

The feature extraction and classification subsystem 120, which may sometimes be referred to herein as a "NLP subsystem," preferably functions to perform various natural language processing tasks including extracting features from clinical note data and computing one or more classification inferences and/or labels for each clinical note file being handled by the clinical note data handling service 105. The NLP subsystem 120 may additionally include one or more text processing modules and/or machine learning models that may tokenize textual data within a clinical note and vectorize and/or generate embeddings for each set of tokens and further cluster the tokens into semantically-related token groups or the like.

In one or more embodiments, the NLP subsystem 120 includes a machine learning module or subsystem that may be intelligently configured to predict various classifications for each clinical note document including, but not limited to, identifying whether a clinical note has a clinical recommendation, a number of clinical recommendations in a given clinical note, a type of clinical recommendation, a strength of a clinical recommendation, an urgency of a clinical recommendation, and/or the like. In such embodiments, the NLP subsystem 120 may include a plurality of distinct machine learning-based classification submodules, which may be outlined herein below in the method 200.

Additionally, or alternatively, in some embodiments, the NLP subsystem 120 may include extensible feature extraction and classification heuristics that may be applied alone or in combination with one or more machine learning-based classifiers described herein.

Additionally, or alternatively, the NLP subsystem 120 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFIT, XLM UDify, MT-DNN, SpanBERT, ROBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELM0, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Automated Recommendation Task Generator

The automated recommendation handling task and instructions generator 130, which may be sometimes referred to herein as a "tasks generator" 130 or "automated task generation subsystem" 130, preferably functions to automatically generate a clinical recommendation registry including one or more tasks and/or one or more instructions for handling and/or disposing of clinical recommendations identified within a clinical note. In one or more embodiments, the task generator 130 may take in as input a set of extracted features and a set of classification inferences computed by the NLP subsystem 120 to compose and/or structure a given registry. It shall be noted that, in some portions of the disclosure, a "clinical recommendation registry" may be referred to as a "clinical recommendation worklist" or the like.

A given clinical recommendation registry preferably includes an enumeration of tasks and/or computer-executable instructions that may be automatically executed by the clinical note handling service 105. Additionally, or alternatively, the clinical recommendation registry may include patient session identifier (ID) data, clinical recommendation ID data, patient communications account data (e.g., email, phone number, messaging ID, etc.) that may be used as input in structuring one or more electronic communications to a given patient, as described herein and using at least e-communications arbiter 140.

1.4 Automated E-Communications Arbiter & Routing

The electronic communications subsystem 140, which may be sometimes referred to herein as an "e-communications arbiter" 140, preferably functions to take in as input a clinical recommendation registry associated with a target clinical recommendation and structure, as output, an automated electronic communication scheme for handling and/or disposing of the target clinical recommendation. Accordingly, the e-communications arbiter 140 may function to intelligently select an optimal communication channel for communicating with an end user or patient, structuring communication parameters, such as a communication schedule and/or communication frequency and composing message content for each communication to the end user. In one or more embodiments, the e-communication arbiter may function to employ a selection matrix or the like for selecting a most optimal communication channel and may further employ pre-trained language models and/or messaging templates to compose messaging content for a given communication.

2. Method for Clinical Note Data Classification and Machine Learning Inference(s)-Informed Automated Electronic Communications As shown in FIG. 2, the method 200 for clinical note data classification and machine learning inference(s)-informed automated electronic communications routing includes implementing feature identification and feature extraction of clinical note data (S210), generating clinical recommendation classification inferences (S220), constructing a set of instructions or tasks for automatically disposing of one or more clinical recommendations (S230), selecting a recommendations communications scheme (S240), and automatically executing one or more recommendations-based communication schemes (S250). It shall be noted that, in some portions of the disclosure, the term "clinical note data" may be interchangeably referred to as an "electronic record," "electronic health record," "target electronic record," or similar recitations. For example, in some portions of the disclosure, the above-described "clinical note data classification" process may be referred to as an "electronic record classification" process.

2.1 Clinical Note Data Feature Identification and Feature/Entity Extraction

S210, which includes implementing feature identification and feature extraction of clinical note data, may function to assess clinical note data for one or more extractable features based on identifying one or more clinical notes. In one embodiment, S210 may function to receive or access a set of clinical notes, from a memory device, which may be in the form of a digital artifact (e.g., electronic record), wherein each clinical note comprises textual data associated with a patient's or user's medical history and doctor's recommendations. Stated another way, a respective clinical note (e.g., electronic record) may include an unstructured component, and the unstructured component may comprise a textual representation of a set of instructions (e.g., narrative text written by an author of the clinical note that optionally describes one or more actions ("action instructions") recommended by the author and/or one or more timeframes ("temporal instructions") for completing such action(s).

In one or more embodiments, S210 may function to implement one or more feature extractors (or feature extraction techniques) that may be specifically configured or specifically designed for identifying features from clinical note data that may support inferences (e.g., classification inferences) for identifying likely clinical recommendations and/or likely time frames for clinical recommendations. That is, in such embodiments, one or more processors of S210 may employ a feature extraction module or subsystem that is programmed to extract relevant features from the clinical notes (e.g., electronic records), including, but not limited to, tokens, keywords, semantic information, temporal references, and contextual cues. Accordingly, in one or more embodiments, an extracted set of features may be used as and/or converted to model or system input or the like for generating one or more classification inferences based on the target clinical note data ("target electronic record").

In a first implementation, based on receiving an input of clinical note data, S210 may function to implement a feature extraction technique using a regular expression search of tokens within a clinical note dataset. In this first implementation, the feature extraction technique may include a combination of search heuristics (e.g., pattern recognition rules or the like) and regular expression logic that, when executed, over the clinical note dataset identify a set of recommendation-informative features (e.g., features helpful in predicting a proposed action instruction in the clinical note) and/or a set of time frame-informative features (e.g., features helpful in predicting a proposed temporal instruction in the clinical note) including, but not limited to, key terms or key nomenclature, implicit or explicit date information, and/or the like. It shall be noted that, in some embodiments, if implicit or explicit date information is unable to be extracted from the clinical note data, S210 may impute such date information. In such embodiments, S210 may function to impute such date information by referencing configurations (e.g., preferences) set by a subscriber and/or by referencing default timeframe configurations defined by a system implementing the method 200.

In a second implementation, in response to receiving or accessing an input of clinical note data in a vectorized form (e.g., feature vectors), S210 may function to implement a feature extraction technique using one or more natural language processing models, such as large pre-trained language models, bag-of-words model, and/or the like. It shall be recognized that, in some embodiments, S210 may implement a combination of feature extraction techniques (e.g., regular expressions+pre-trained language models+named-entity recognition models) to extract a comprehensive set of features vectors from clinical note data.

Additionally, or alternatively, in the case that the clinical note data includes a digital representation (e.g., a pdf, or an image scan of a physical clinical note), S210 may function to perform character and text recognition using any suitable character recognition application or scanner, such as optical character recognition (OCR). In such embodiments, S210 may function to identify typed or written text or characters of a target clinical note data and extract the identified text or characters of the target clinical note.

Moreover, the set of features extracted from clinical note data may be attributed to at least two distinct domains of features including, but not limited to, clinical recommendation-related features (also referred to as "proposed action instruction features," a first set of features or feature vectors, and/or the like) and time frame related features (also referred to as "proposed temporal instruction features," a second set of features or feature vectors, and/or the like). A clinical recommendation-related feature, as referred to herein, may be an extracted or derived feature or set of tokens from the clinical note dataset that likely informs (e.g., corresponds to) a prediction for one or more clinical recommendations. A time frame-related feature, as referred to herein, may be an extracted or derived feature or set of tokens from the clinical note dataset that likely informs (e.g., corresponds to) temporal bounds, such as dates for completing or acting on a recommendation or completing a task proposed within the clinical dataset.

2.2 Clinical Note Data Recommendation Classification Inferences

S220, which includes generating clinical recommendation classification inferences, may function to compute one or more recommendation classification inferences based on one or more sets of features extracted from clinical note data. In a preferred embodiment, the one or more sets of extracted features may be extracted from target clinical note data in the manner described in S210. In such preferred embodiment, a feature extraction subsystem or the like implemented by method 200 may operate to extract one or more sets of features from the target clinical note data and make accessible (by storing for or transmitting to) a recommendation classification subsystem executing functions described in at least S220. It shall be noted that, in some portions of the disclosure, the (clinical) recommendation classification inferences described herein may be simply referred to as "classification inferences" or the like, and that different classification inferences may be referred to as a first, second, third, etc. classification inference.

i. Recommendation Identification+Classification Inferences

In a preferred embodiment, generating clinical recommendation classification inferences includes implementing a binary recommendation classifier that may function to produce a general classification inference indication whether target clinical note data (e.g., electronic record) includes at least one recommendation ("proposed action instruction"). That is, in such preferred embodiment, the binary recommendation classifier may be configured to output one of a TRUE/FALSE, I/O, and/or similar binary pair in which a prediction of a first of the binary pair positively indicates that there is likely at least one clinical recommendation within the clinical note data and a prediction of a second of the binary pair negatively indicates that there is likely not at least one clinical recommendation within the clinical note data.

Figure 3:
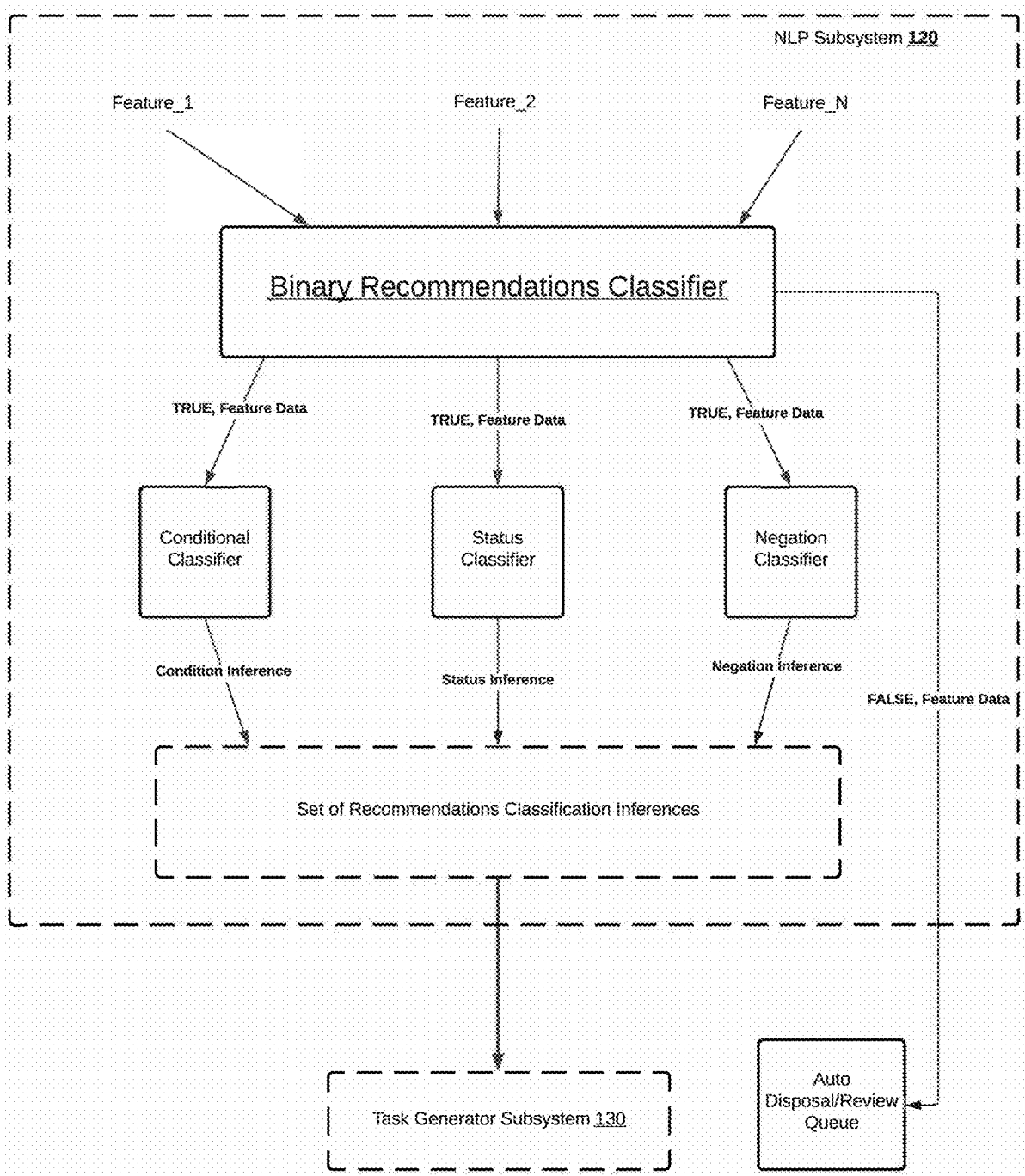
FIG. 3 illustrates an example mixed process flow and block diagram of a subsystem 120 of system 100 in accordance with one or more embodiments of the present application.

In one or more embodiments, an output of the binary recommendation classification may inform a routing of the clinical note data and/or the set of features extracted from the clinical note data to one or more downstream clinical note data handling stages. In one example, a positive binary recommendation classification inference may cause method 200 to instantiate and/or route the clinical note data to a recommendation type classification stage (e.g., modality determination classification stage) that may function to generate a further classification inference of a specific recommendation type (e.g., recommendation modality) of a plurality of distinct recommendation types (e.g., recommendation modalities) of the clinical note data. In another example, a negative binary recommendation classification inference may cause the method 200 to forgo computing downstream classification inferences and/or route the clinical note data to a null recommendation stage at which the clinical note data may be added to a manual review queue for inspection by an analyst or placed in a separate queue for immediate disposal without an identified recommendation (as generally illustrated in FIG. 3).

Figure 4:
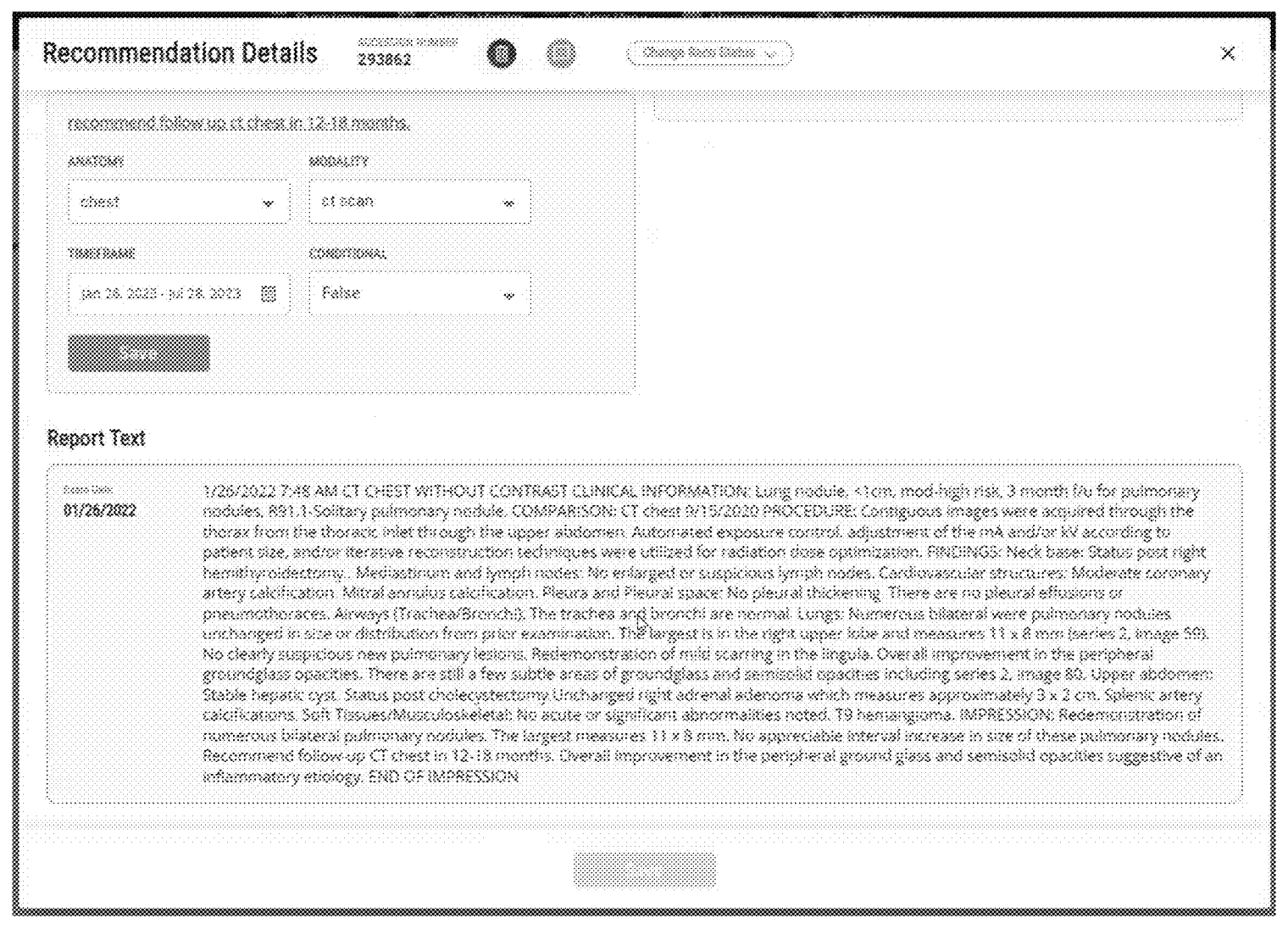

For instance, in some embodiments as illustrated in FIG. 4, the recommendation type classification stage may compute an inference that indicates that the type of clinical note recommendation pertains to a particular medical procedure or examination (e.g., modality). Stated another way, the recommendation type classification inference may identify the modality associated with the clinical note recommendation, such as a CT scan, mammogram, ultrasound, etc., as the recommended course of action based on features extract from the clinical note data (e.g., the first set of features). Accordingly, in this non-limiting example, a recommendation type refers to the category of the recommendation, and specifically, the "modality" of the medical examination or treatment being recommended.

In a first implementation, the binary recommendation classifier may be implemented by an unsupervised pre-trained language model, such as a language transformer model. In this first implementation, the language transformer model may include a question-and-answer language transformer model (Q & A transformer). In such implementation, to enable an operation of the Q & A transformer, S220 may set or define the knowledge base or answer bank of the Q & A transformer using an input of the clinical note dataset. Once the knowledge base of the Q & A transformer is set, S220 may function to apply a recommendation-based query to the Q & A transformer for identifying whether at least one clinical recommendation likely exists within the knowledgebase of the Q & A transformer. The recommendation-based query, in some embodiments, may comprise question text, such as "Does the clinical note include a proposed action instruction?". The Q&A transformer may then search the knowledgebase to generate an answer (e.g., "Yes" or "No") to the query.

In a second implementation, the binary recommendation classifier may be implemented by a supervised machine learning model that is specifically trained using one or more labeled datasets that includes labeled training samples of clinical note data having clinical recommendations and training samples of clinical note data without clinical recommendations.

ii. Conditional Recommendation Classification Inference

In one embodiment, generating clinical recommendation classification inferences includes predicting a level of requirement of a target clinical recommendation identified within clinical note data using a conditional recommendation machine learning-based classifier (conditional recommendation classifier) based on a set of features extracted from target clinical note data. In one or more embodiments, S220 employing the conditional recommendation machine learning-based classifier may generate conditional recommendation classification inferences along a strength of recommendation continuum spanning from not required to strongly required or similarly, spanning from a suggestive recommendation to an explicit recommendation. It shall be recognized that any suitable scale or continuum of values may be employed to convey a relative strength of a clinical recommendation based on an inference value of the conditional recommendation classifier. The conditional recommendation machine learning-based classifier optionally comprises a machine learning classification algorithm trained on a training corpus comprising samples of clinical notes labeled with known conditional or requirement levels.

In a non-limiting example, S220 implementing the conditional recommendation classifier may function to receive as input a set of features extracted from target clinical note data, in a vectorized form, as input into the classifier. In this non-limiting example, the conditional recommendation classifier may function to generate a conditional recommendation classification inference value that may be converted to or normalized to a classification label, such as "Strong Recommendation" or "Explicit Recommendation", along the strength of recommendation scale.

Figure 5:
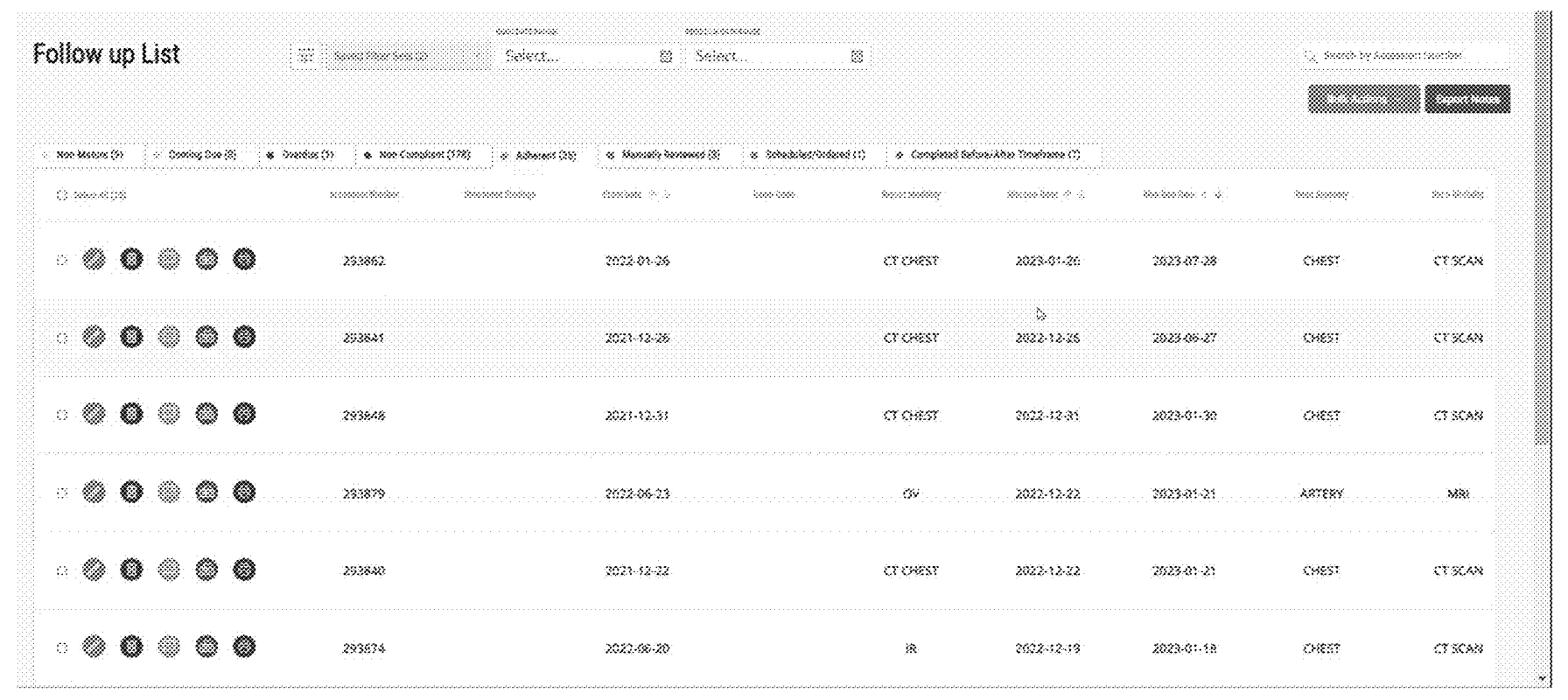

Stated another way, as illustrated in FIG. 5, the conditional recommendation classifier may compute a classification inference that indicates whether the proposed action instruction detected in the clinical note is a conditional action instruction. A conditional action instruction, as generally used herein, may refer to an instruction that needs certain criteria to be met. In some embodiments, the inference generated by the conditional recommendation machine learning classifier may include a Boolean value (e.g., "True" if the recommendation is conditional on other criteria or "False" if the recommendation is not conditional on other criteria).

iii. Recommendation Status Classification Inference

In one embodiment, generating clinical recommendation classification inferences includes predicting an urgency classification of a clinical recommendation within clinical note data using a recommendation status machine learning-based classifier (urgency classifier). In a preferred embodiment, a set of features extracted from target clinical note data may be utilized as input to the urgency classifier, which has been trained on a labeled dataset of clinical notes with known urgency levels. The classifier employs algorithms and models to analyze the extracted features and predict the urgency of the doctor's recommendation within the clinical note data. The urgency levels may additionally include low risk, medium risk, high risk, or other suitable categorizations. The predictions generated by the classifier can assist healthcare professionals in prioritizing and addressing urgent medical cases, thereby enhancing patient care and clinical decision-making processes.

In one embodiment, in addition to predicting the urgency level, the urgency classifier classification inference values may be converted to urgency scores or urgency ratings that may be associated with each prediction. In such embodiment, the urgency scores or ratings quantify a degree of urgency for each recommendation within the clinical note data. For example, a higher score may indicate a higher level of urgency, while a lower score may indicate a lower level of urgency of an identified recommendation. The urgency scores or urgency ratings may be based on probabilities, confidence levels, or any other suitable measure derived from the urgency classifier's analysis of the set of features extracted from clinical note data.

Furthermore, the urgency scores or urgency ratings can be used to categorize the urgency levels into different levels of risk. For instance, the machine learning-based classifier may assign low-risk recommendations a lower score or rating, medium-risk recommendations a moderate score or rating, and high-risk recommendations a higher score or rating. This provides a finer-grained assessment of urgency, enabling downstream subsystems (e.g., the automated electronic communications subsystem) to prioritize and/or select a relevant communications scheme for addressing (e.g., triaging) clinical recommendations more effectively.

iv. Recommendation Negation Classification

In one embodiment, generating clinical recommendation classification inferences includes predicting a negation classification of a clinical recommendation within clinical note data using a negated recommendation status machine learning-based classifier (negation classifier). In a preferred embodiment, a set of features extracted from target clinical note data may be utilized as input to the negation classifier, which has been trained on a labeled dataset of clinical notes with known content that negate one or more recommendations. The negation classifier may employ algorithms and models to analyze the set of features extracted from clinical note data and predict whether a recommendation has been negated by a doctor within the clinical note data.

Additionally, or alternatively, in some embodiments, the algorithms and models employed by the negation classifier may function to predict whether target clinical note data implicitly or explicitly states that no follow-up or further action is required from a patient. Stated differently, the negation classifier may function to identify scenarios in which the clinical note data includes no recommendation(s) for the patient to follow (e.g., thereby enabling a routing to the auto disposal or manual review queue as described above).

v. Part Classification|Anatomy Classification

In one embodiment, generating clinical recommendation classification inferences includes predicting an anatomy classification (e.g., part classification) for a clinical recommendation within clinical note data using an anatomy classifier (e.g., part classifier). The anatomy classifier, in some embodiments as illustrated in FIG. 4, may utilize one or more sets of features extracted in S210 as input and predict, as output, a specific (body) part or system relevant to the clinical recommendation (e.g., chest, thyroid, heart, lungs, etc.). The anatomy classifier, in some embodiments, may be trained on a labeled dataset of clinical notes with known anatomical references, such as "thyroid," "heart," or "lungs." Accordingly, such training may enable the anatomy classifier to analyze the features received as input and predict the anatomical focus of the recommendation based on such features.

vi. Timeframe Classification Inference

In one embodiment, generating clinical recommendation classification inferences includes predicting a timeframe classification inference for the clinical recommendation within clinical note data using a timeframe classifier. The timeframe classifier, in some embodiments as illustrated in FIG. 4, may utilize one or more sets of feature extracted in S210 (e.g., the second set of feature vectors) as input and predict, as output, a timeframe classification to each recommendation, indicating when the proposed action is to be completed (e.g., a date and/or time that the action is due). The timeframe classifier may be trained on a labeled dataset of clinical notes with known recommendation timeframes, such as immediate, two weeks, within six months, annually, etc.

2.3 Clinical Note Data Handling|Disposal Instruction(s) Generation

S230, which includes constructing a set of instructions or tasks for automatically disposing of one or more clinical recommendations, may function to generate a set of recommendation disposal or handling tasks and/or instructions based on recommendation classification inferences (e.g., sourced from S220) that, when executed, operate to enable an automated disposal of one or more inferred clinical recommendations of target clinical note data.

In one implementation, constructing the set of recommendation disposal or handling instructions may include employing a search of a task matrix, task repository or the like. A data structure of the task matrix may take the form of a task lookup table such that the corpus of recommendation classification inferences may be used as search criteria for looking up or discovering relevant tasks within the task lookup table. Accordingly, a search query intended for constructing a recommendation-handling task list or disposal instructions may be defined at least by each of the recommendation classification inferences and/or additionally, one or more parts of the set of features extracted from target clinical note data. In a non-limiting example, S230 may function to define a tasks or an instructions query based on pairings between a given recommendation classification inference and an extracted time frame feature. In this non-limiting example, one or more tasks for handling a given recommendation classification inference may be identified together with at least one time frame for handling all or part of the one or more tasks.

In one or more embodiments, a task matrix may include an enumeration or index of recommendation handling tasks in association with or mapped to one or more distinct recommendation classification inferences that trigger an application of the respective one or more recommendation handling tasks or instructions.

Additionally, or alternatively, S230 may function to convert or transform a set of recommendation classification inferences and/or time frame feature data to recommendation handling tasks or instructions based on an application of task construction heuristics or the like. In one or more embodiments, the task construction heuristics may include task determination rules, task determination logic, and/or the like that may be applied to inputs of recommendation classification predictions and/or associated time frame data to automatically construct or structure a set of recommendation handling tasks or instructions.

In some embodiments, the set of instructions or tasks identified by S230 may form part of a clinical recommendations registry (described in the system 100). Specifically, in some embodiments, the clinical recommendations registry may group the set of instructions or tasks into time-based statuses (when the recommendation is due) and action-based statuses (actions taken by a user). It shall be noted that, in some embodiments, the clinical recommendations registry may be accessible to a target patient or subscriber via a graphical user interface or the like.

In some embodiments, S230 may update the clinical recommendations registry based on the status of a target patient (or changes to an underlying structured digital artifact as described in detail below). For instance, in a non-limiting example, the set of tasks or instructions underlying the clinical recommendations registry may change when it is detected that a target patient (e.g., user) schedules a subsequent exam, orders a subsequent exam, and/or completes the subsequent exam. Additionally, or alternatively, in some embodiments, S230 may function to automatically close one or more of the tasks or instructions included in the clinical recommendations registry. In such embodiments, the automatic closure of tasks may be performed upon S230 detecting that such tasks satisfy closure or exit criteria. For instance, in a non-limiting example, S230 may function to automatically close one or more tasks or instructions when S230 detects that the one or more tasks have been scheduled, ordered, completed, and/or the like.

It shall be noted that such embodiments may be advantageous for numerous reasons including preventing S240 and S250 from sending electronic communications/notifications for tasks already fulfilled.

Generating a Structured Digital Artifact

Additionally, or alternatively, in some embodiments, S230 may generate a structured digital artifact based on the classification inferences produced in S220. A structured digital artifact, as used herein, may refer to a record or entry that is created and stored within a clinical recommendations registry. This artifact may typically include structured data such as classifications and recommendations that have been derived from or extracted from clinical note data.

In some embodiments, the generation of the structured digital artifact may include generating a cell-based container comprising multiple distinct cells. For instance, as depicted in FIG. 5, S230 may create a grid container with four (4) cells (e.g., two rows and two columns). The cells in this grid may include, but should not be limited to, an anatomy cell (e.g., a first cell), a modality cell (e.g., a second cell), a timeframe cell (e.g., a third cell), and/or a conditional cell (e.g., a fourth cell).

As also illustrated in FIG. 4, S230 may insert tokens into one or more of these cells. The tokens inserted in the anatomy cell, modality cell, timeframe cell, and conditional cell may correspond to (or at least be informed by) the classification inferences computed in S220—specifically, the anatomy classification inference, recommendation type classification inference, timeframe classification inference, and conditional classification inference, respectively. Accordingly, in some embodiments, the tokens or values inserted into these cells may reflect the specific details extracted from the clinical note data and categorized in S220.

For example, the anatomy cell may include anatomy tokens such as "chest," derived from the anatomy classification inference, to visually indicate the specific anatomical area relevant to the recommendation. The modality cell may include modality tokens like "ct scan," derived from the recommendation type classification inference, to visually indicate the suggested diagnostic procedure. The timeframe cell may include timeframe tokens such as "Jan. 26, 2023-Jul. 28, 2023," based on the timeframe classification inference, to visually indicate the recommended period for follow-up actions. Finally, the conditional cell may contain one or more conditional tokens (e.g., a Boolean value) such as "False," derived from the conditional classification inference, to visually indicate whether the recommendation is conditional.

Furthermore, in some embodiments, the cells of the cell-based container may include or correspond to user interface elements. The user interface elements, such as text input fields, dropdown menus, etc., may be responsive to user inputs to allow users to interact directly with the data. For example, in some embodiments, such user interface elements may be configured to receive input for modifying the values (e.g., tokens) of the cells-such as updating the anatomy, modality, timeframe, or conditional status-based on user input or preferences.

Moreover, in some embodiments, the cell-based container may include a header area. In some embodiments, S230 may generate and insert header text into the header area, as generally illustrated in FIG. 4. The header text, in some embodiments, may be generated based on the first set and the second set of feature vectors extracted in S210 (e.g., a merging of the two sets of feature vectors or a subset of the tokens extracted via the two sets of feature vectors). The generated header text, as generally used herein, may provide a summary or overview of the clinical recommendation, thus capturing the essence of the recommendation(s) and its timing (e.g., "recommend follow up ct chest in 12-18 month").

It shall be noted that the structured digital artifact may include additional, different, or fewer components than described above. For example, as also illustrated in FIG. 4, generating the structured digital artifact may include generating a text input field. In some embodiments, as also illustrated in FIG. 4, S230 may automatically insert the textual representation of the set of instructions into the text input field. Accordingly, this allows users to view and interact with the full textual details of the clinical note data, enabling them to adjust the cells or provide additional input as necessary.

Graphical User Interface(s) of a Clinical Recommendations Registry

In some embodiments, S230 may display the aforementioned clinical recommendations registry using one or more graphical user interfaces. As generally shown in FIGS. 4 and 5, the graphical user interface(s) that are used to display the clinical recommendations registry may include a plurality of selectable binning categories and a matrix. A respective selectable binning category control, as generally used herein, may refer to a user interface element that, when selected, causes method 200 (e.g., S230) to filter and display a set of structured digital artifact entries (e.g., follow-up recommendations) that satisfy criteria of the selected control. A matrix, as generally used herein, may refer to a structured layout (e.g., table) within the user interface that organizes and presents structured digital artifacts entries (e.g., follow-up recommendations). It shall be noted that the term "structured digital artifact entry," as generally used herein, may refer to a user interface entry (e.g., row) that corresponds to a structured digital artifact.

As generally illustrated in FIG. 5, the plurality of selectable binning categories may include, but should not be limited to, a non-mature bin selection control, a coming due bin selection control, an overdue bin selection control, a non-compliant bin selection control, an adherent bin selection control, a manually reviewed bin selection control, a scheduled/ordered bin selection control, a completed before/after timeframe bin selection control, and/or the like. It shall be noted that FIG. 5 is not intended to be limiting and that the user interface(s) displayed by S230 may include additional, different, or fewer bin selection controls than illustrated without departing from the scope of the disclosure (e.g., overdue bin selection control, non-compliant bin selection control, a manually reviewed bin selection control). Non-limiting operations of such bin selection controls will now be described.

The non-mature bin selection control, when selected, may cause the task binning matrix to display structured digital 1 artifact entries (e.g., follow-up recommendations) that have a due date between an initial exam date and a minimum due date minus thirty (30) days. The coming due bin selection control, when selected, may cause the task binning matrix to display structured digital artifact entries (e.g., follow-up recommendations) that are between a minimum due date minus thirty days and a max due date. The overdue bin selection control, when selected, may cause the task binning matrix to display structured digital artifact entries (e.g., follow-up recommendations) that are between a maximum due date and sixty days after the maximum due date. The non-compliant bin selection control, when selected, may cause the task binning matrix to display structured digital artifact entries (e.g., follow-up recommendations) that remain incomplete sixty (60) days after a maximum due date.

Furthermore, the adherent bin selection control, when selected, may cause the task binning matrix to display structured digital artifact entries (e.g., follow-up recommendations) that are completed between a minimum due date minus thirty days or beyond 60 days after a maximum due date. The scheduled bin selection control, when selected, may cause the task binning matrix to display structured digital artifact entries (e.g., follow-up recommendations) that are scheduled but not completed. Lastly, the manually reviewed task bin selection control, when selected, may cause the task binning matrix to display structured digital artifact entries whose status has been manually updated by a user (e.g., updated to acknowledged, not clinically necessary, completed elsewhere, patient deceased, unsubscribed, navigator closed, needs prior auth, needs prescription, etc.).

In some embodiments, as described above, S230 may automatically monitor for changes to a status of a structured digital artifact. For instance, in some embodiments, S230 may receive (e.g., real-time updates), via an applicant programming interface (API), HL7 engine, or the like, data or a signal indicating that a patient completed a scheduling of a recommended action (e.g., scheduled a recommended exam). In response to receiving this data or signal, S230 may function to search the above-described clinical registry for a structured digital artifact corresponding to the patient and the recommended action. Upon identifying the corresponding structured digital artifact, S230 may update the status of the corresponding structured digital artifact from a previous status (e.g., coming due, etc.) to a new status (e.g., scheduled/ordered). Additionally, in some embodiments, the graphical user may provide an indication of the new status of the structured digital artifact. For example, S230 may visually move the structured digital artifact (e.g., an entry corresponding to the structured digital artifact) from being associated with the binning category associated with the previous status to a binning category associated with the new status.

In some embodiments, a respective structured digital artifact entry displayed in the matrix may represent a distinct follow-up recommendation extracted from a target clinical record. Furthermore, in some embodiments, a respective structured digital artifact (and corresponding entry in the matrix) may comprise or be digitally linked to the attributes listed above (e.g., minimum due date, maximum due date, scheduled date, etc.) and/or one or more other attributes. For example, a structured digital artifact may include one or more of a "PatientMRN" attribute, which refers to the Medical Record Number (MRN) of the target clinical record associated with the respective structured digital artifact. Similarly, the task entry may include an "AccessionNumber" attribute, which is a unique identifier assigned to a specific imaging examination or test order within the target clinical record.

Additionally, as illustrated in FIGS. 4 and 5, a "ReportText" attribute may be included, representing the narrative portion of the radiology report (e.g., clinical note) containing detailed findings, impressions, recommendations, and conclusions. An "InitialExamDate" attribute, indicating the date of the patient's first examination, may also be included. Attributes named "ReferringPhysicianFirstName" and "ReferringPhysicianLastName" may also be included and refer to the given name and surname of the physician who requested the imaging examination, while a "ReferringPhysicianUniqueIdentifier" attribute may refer to an identification of this physician within a healthcare organization. Furthermore, a "PatientInitialExamImagingModality" attribute may be included and describe the type of imaging technology used during the patient's initial examination. Finally, the task entry may additionally, or alternatively, include the "ReadingRadiologistFirstName" and "ReadingRadiologistLastName" attributes, which may refer to the given name and surname of the radiologist who interpreted the imaging study, along with the "ReadingRadiologistUniqueID" attribute (e.g., an ID of the reading radiologist).

In some embodiments, the entries displayed in the matrix are selectable. S230, in some embodiments, may detect a selection of one or more of the entries. Based on or in response to detecting such a selection of an entry, S230 may display the structured digital artifact corresponding to such selected entry in a user interface that overlaid on the graphical user interface at which the selection was detected and/or display the structured digital artifact in a different user interface (as previously described above with reference to FIG. 4). It shall be noted that, in some embodiments, the user interface displaying a structured digital artifact may be referred to as "the user interface," a first user interface, or similar recitations. Conversely, the user interface displaying the matrix of structured digital artifact entries may be referred to as a "second user interface" (or similar recitations).

2.4 Communication Arbitration & Communications Scheme Encoding Communication Construction S240, which includes selecting a recommendations communications scheme, may function to identify or select, from a computer database, one or more electronic communications schemes and automatically construct an electronic communication based on recommendations handling tasks associated with a target recommendation dataset. In one or more embodiments, S240 employing a communications arbiter may function to select a communication scheme from a plurality of communication schemes and cause an automatic construction of message content based at least on the recommendations handling tasks and associated target recommendation dataset.

In one embodiment, selecting a recommendations communications scheme may include selecting a target communications channel from a plurality of distinct communication channels based on the recommendations handling tasks associated with a target recommendation dataset. In a non-limiting example, a plurality of electronic communication channels may include one or more of an SMS communication channel, a mobile or cellular device communication channel, an e-mail communication channel, a web-based dashboard, and/or the like. In such an example, S240 employing a communications arbiter or the like may select one of the plurality of electronic communication channels based on selection criteria associated with a given recommendations handling tasks or instructions. In one implementation, the given recommendations handling tasks may explicitly identify a target electronic communication channel, which the communications arbiter selects and sets as the electronic communication channel for transmitting one or more recommendations-based messages to a patient or a user. In another implementation, S240 may use factors derived from the recommendations handling tasks and/or from an associated recommendations dataset to select one of the plurality of distinct electronic communication channels. In a non-limiting example, S240 may function to select the electronic communication channel based on an urgency classification inference or score. For instance, if S240 identifies a high-urgency classification inference or score (e.g., an urgency score satisfying or exceeding a high-urgency value or threshold) within the recommendations dataset, S240 may function to select an electronic communications channel with the highest speed or efficiency (e.g., SMS message) in communicating a recommendations message to an end user account or target recipient account.

Additionally, or alternatively, in some embodiments, selecting a recommendations communications scheme may be informed at least in part by a cohort engine implemented by the method 200. The cohort engine, as generally referred to herein, may function to map a target patient or user to a target cohort of patients or users based on a patient's or user's medical history, a patient's or user's medical condition, a patient's or user's medical treatment plan, and/or the like. It shall be noted that, in some portions of the disclosure, the criteria used to map a target patient or user to a target cohort may be referred to as "cohort identification criteria," "a set of cohort identification criteria," and/or the like.

Accordingly, in such embodiments, the target cohort of patients may inform the selection of a recommendations communications scheme for a target patient. For instance, in a non-limiting example, S240 may select recommendations communications scheme for a target patient based on communication preferences, needs, requirements, or characteristics of the target cohort of patients. It shall be noted that such embodiments may be advantageous for numerous reasons including, but not limited to, allowing for more personalized and effective communication of recommendations to patients or users.

Additionally, or alternatively, automatically constructing an electronic communication may include generating a recommendations message, which may be transmitted via a selected electronic communications channel. In a first implementation, S240 may function to select one of a plurality of message templates and interleave one or more items of data sourced from a target set of recommendations handling tasks and/or from a target recommendations dataset. In such embodiments, the selected message template may include pre-filled or predetermined messaging with one or more token slots to be filled by data sourced from the target set of recommendations handling tasks and/or from the target recommendations dataset. In a second implementation, S240 may function to generate a custom message by employing one or more large pre-trained language models (e.g., a generative language model or the like), which may receive as input one or more aspects of the recommendations handling tasks or instructions and/or one or more parts of the recommendations dataset and generate recommendations message content.

Additionally, or alternatively, selecting a recommendations communications scheme may include selecting or setting a communication frequency parameter or communications schedule. In one or more embodiments, the communication frequency parameter may relate to or define a number of instances or times that one or more recommendations messages may be transmitted via one or more of the selected communication channels. In one or more embodiments, the communications schedule may relate to or define set dates and/or times at which a given recommendations communication message may be transmitted via one or more of the selected communications channels.

Furthermore, in some embodiments, one or more steps of S240 may be executed in response to S230 generating a structured digital artifact. For instance, in response to S230 generating a structured digital artifact, S240 may obtain, from a computer database, one or more communication channels associated with (or based on) a record identifier attribute of the structured digital artifact. In this example, the record identifier attribute may be a userID attribute. Accordingly, in such embodiments, obtaining the one or more communication channels associated with the userID attribute may include obtaining, from the computer database, the communication channels that are associated with that userID attribute. It shall be noted that, in some embodiments, S230 may determine that a communication channel is associated with the userID attribute if the user associated with the userID has (implicitly or explicitly) activated such communication channel. Conversely, in some embodiments, S230 may determine that a communication channel is not associated with the userID attribute if the user associated with the userID has not (implicitly or explicitly) activated such communication channel.

In some embodiments, S240 may select and set a communication scheme attribute of the structured digital artifact based on (e.g., in view of) the one or more communication channels obtained from the computer database. For instance, in some embodiments, S240 may search for a lookup entry in a lookup data structure that lists one or more optimal communication channels for the likely proposed action instruction type (e.g., action type) and the likely proposed temporal instruction (e.g., timeframe urgency). For example, if the action instruction type is "CT scan" and the temporal instruction indicates a date is within the next four weeks, the corresponding lookup data entry might list SMS (e.g., first communication channel) and push notifications (e.g., a second communication channel) as the optimal channels due to their immediacy. S240 would extract and assess these optimal communication channels against the user's preferred communication channels and determine that SMS is active but push notifications are not. As a result, S240 may add SMS to the communication preference parameter of the communication scheme attribute, ensuring the reminder is sent promptly, while push notifications may not be added to the communication preference parameter to respect user preference (e.g., forgo adding push notifications to the communication preference parameter).

In another example, if the action instruction type is "routine health check-up reminder" and the proposed temporal instruction indicates a timeframe of one year, the corresponding lookup entry might list email and postal mail as optimal channels for such non-urgent communications. In such a non-limiting example, S240 might find that the patient has activated both email and postal mail. Thus, both channels could be added to the communication preference parameter, allowing the system to send reminders through both methods, providing the patient with ample notice in a less time-sensitive manner.

Additionally, in some embodiments, the lookup entry not only lists optimal communication channels but also provides an optimal communication frequency for these channels. Accordingly, in some embodiments, setting the communication scheme attribute of the structured digital artifact may further include setting (e.g., configuring) a communication frequency parameter to align with this optimal frequency. For example, in the case of a "CT scan" reminder where SMS has been selected as the preferred communication channel, the lookup data might suggest sending reminders at specific intervals, such as every other day, one day before the proposed temporal instruction, and/or the like. In such an example, in turn, S240 may set the communication frequency parameter accordingly, ensuring that reminders are sent at these optimal times to enhance the likelihood of the user performing, scheduling or attending the recommendation.

In another example, if the action instruction type involves ongoing monitoring, such as "weekly medication adherence checks," and the temporal instruction indicates an indefinite timeframe, the lookup data entry might recommend a frequency of weekly messages. In such an example, email and SMS may be identified as the optimal channels, with SMS already included in the communication preference parameter. In that case, S240 may set the communication frequency parameter to send weekly SMS reminders, ensuring consistent and timely communication. This approach not only respects user preferences but also leverages the most effective communication methods and frequencies to support user engagement and adherence to medical advice.

2.5 Executing Recommendation-Based Communications Scheme

S250, which includes automatically executing one or more recommendations-based communication schemes, may function to automatically execute a given electronic route one or more recommendations-based communications based on a recommendations-based communications scheme associated with target clinical note data and/or based on the communication scheme attribute of the structured digital artifact.

In one or more embodiments, automatically executing the one or more recommendations-based communication schemes includes loading message content to a transmission queue or the like, setting a transmission destination for a given communication channel, encoding an electronic communications subsystem (e.g., subsystem 140) with a communication frequency and/or communication schedule based on the recommendations-based communications scheme associated with target clinical note data (and/or in accordance with S240).

Additionally, or alternatively, the method 200 via the e-communications arbiter or similar subsystem or module may function to monitor and/or track a progress in completing the one or more clinical recommendations of each recommendations-based communication (as also previously described in S230). In one or more embodiments, the method 200 may function to determine a status of the one or more clinical communication, which may include, but should not be limited to, one or more of an incomplete status, a pending status, an attention required status, a complete status or the like. It shall be recognized that the status types may be extensible to various types of statuses. Once a status is determined, the method 200 may function to update one or more subsystems or modules of the system 100 with the status information. In some embodiments, the status information may be used to modify or update one or more recommendations communications schemes.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for electronic record classification and machine learning inference(s)-informed automated electronic communication, the computer-implemented method comprising:
    at a remote record handling service:
        obtaining, from a memory device, one or more electronic records comprising an unstructured component, the unstructured component comprising a textual representation of a set of instructions;
        extracting, by one or more computer processors executing a feature extractor programmed to extract:
            (a) a first set of feature vectors from the textual representation of the set of instructions, the first set of feature vectors comprising features related to a proposed action instruction, and
            (b) a second set of feature vectors from the textual representation of the set of instructions, the second set of feature vectors comprising features related to a proposed temporal instruction;
        computing, by one or more trained machine learning classifiers, a first classification inference that indicates a likely proposed action instruction type of a plurality of action instruction types based on an input of the first set of feature vectors;
        computing, by the one or more trained machine learning classifiers, a second classification inference that indicates a likely proposed temporal instruction based on an input of the second set of feature vectors;
        generating, by the one or more computer processors, a structured digital artifact accessible via a graphical user interface based on (1) the first classification inference and (2) the second classification inference, wherein generating the structured digital artifact includes:
            generating a cell-based container that includes a plurality of distinct cells;
            automatically inserting one or more action tokens into at least a first cell of the plurality of distinct cells based on the likely proposed action instruction type;
            automatically inserting one or more temporal tokens into at least a second cell of the plurality of distinct cells based on the likely proposed temporal instruction; and
        in response to generating the structured digital artifact:
            obtaining, from a computer database, one or more communication channels based on a record identifier associated with the one or more electronic records;
            selecting and setting a communication scheme attribute of the structured digital artifact based on the one or more communication channels; and
            automatically transmitting one or more electronic communications based on the communication scheme attribute of the structured digital artifact.

2. The computer-implemented method according to claim 1, wherein:
    the method further includes:
        computing, by the one or more trained machine learning classifiers, a third classification inference that indicates a likely proposed part involved in the likely proposed action instruction, and
    generating the structured digital artifact further includes:
        automatically inserting one or more part tokens into at least a third cell of the plurality of distinct cells based on the likely proposed part involved in the likely proposed action instruction.

3. The computer-implemented method according to claim 1, wherein:
    extracting the first set of feature vectors includes extracting tokens, from the textual representation of the set of instructions, that correspond to the proposed action instruction,
    extracting the second set of feature vectors includes extracting tokens, from the textual representation of the set of instructions, that correspond to the proposed temporal instruction,
    the cell-based container includes a header area, and
    generating the structured digital artifact further includes:
        generating header text based on the tokens that correspond to the proposed action instruction and the tokens that correspond to the proposed temporal instruction, and
        automatically inserting the header text into the header area based on tokens.

4. The computer-implemented method according to claim 1, wherein:
    the computer-implemented method further includes:
        computing, by the one or more trained machine learning classifiers, a third classification inference that indicates whether the proposed action instruction is a conditional action instruction, and generating the structured digital artifact further includes:

automatically inserting one or more Boolean tokens into at least a third cell of the plurality of distinct cells based on whether the proposed action corresponds to the conditional action instruction.

5. The computer-implemented method according to claim 1, wherein:

the computer-implemented method further includes:

displaying a second graphical user interface comprising:

a matrix that includes entries corresponding to a plurality of structured digital artifacts, including an entry corresponding to the structured digital artifact;

detecting a selection of the entry corresponding to the structured digital artifact; and based on detecting the selection of the entry corresponding to the structured digital artifact, displaying the structured digital artifact by overlaying the graphical user interface over the second graphical user interface.

6. The computer-implemented method according to claim 5, wherein:

the entries included in the matrix correspond to a first binning category, and the method further includes:

automatically monitoring for changes to a status of the structured digital artifact, while automatically monitoring for the changes to the status of the structured digital artifact, detecting that the status of the structured digital artifact changed from a status associated with the first binning category to a status associated with a second binning category, and visually moving, in the second graphical user interface, the structured digital artifact from being associated with the first binning category to being associated with the second binning category.

7. The computer-implemented method according to claim 5, wherein:

the second graphical user interface further comprises a plurality of selectable binning categories, and the method further includes:

detecting a selection of a respective binning category of the plurality of selectable binning categories; and based on detecting the selection of the respective binning category, updating the matrix to include a new set of entries, wherein the new set of entries correspond to a plurality of structured digital artifacts that relate to the respective binning category.

8. The computer-implemented method according to claim 1, wherein selecting and setting the communication scheme attribute of the structured digital artifact includes:

searching for a lookup entry in a lookup data structure that lists optimal communication channels for the likely proposed action instruction type and the likely proposed temporal instruction, extracting the optimal communication channels from the lookup entry, determining that the one or more communication channels comprise a first communication channel that is included in the optimal communication channels and a second communication channel that is not included in the optimal communication channels, adding the first communication channel to a communication preference parameter of the communication scheme attribute, and forgoing adding the second communication channel to the communication preference parameter of the communication scheme attribute.

9. The computer-implemented method according to claim 1, wherein:

the lookup entry further lists an optimal communication frequency for the optimal communication channels, and setting the communication scheme attribute of the structured digital artifact further includes:

setting a communication frequency parameter of the communication scheme attribute to correspond to the optimal communication frequency.

10. The computer-implemented method according to claim 1, wherein:

the one or more communication channels obtained from the computer database have been activated by a user associated with the record identifier, the communication scheme attribute is further selected and set based on the likely proposed action instruction type and the likely proposed temporal instruction, and automatically transmitting the one or more electronic communications based on the communication scheme attribute of the structured digital artifact includes:

automatically transmitting the one or more electronic communications based on a communication frequency property of the communication scheme attribute.

11. The computer-implemented method according to claim 1, wherein the textual representation of the set of instructions includes:

a textual representation of the proposed action instruction, and a textual representation of the proposed temporal instruction, wherein the proposed temporal instruction specifies a timeframe that the proposed action instruction is to be completed.

12. The computer-implemented method according to claim 1, wherein the features related to the proposed action instruction include:

features that support the one or more trained machine learning classifiers in determining whether the one or more electronic records include at least one proposed action instruction, features that support the one or more trained machine learning classifiers in determining the likely proposed action instruction type, features that support the one or more trained machine learning classifiers in determining whether the proposed action instruction is a conditional action instruction, and features that support the one or more trained machine learning classifiers in determining whether the proposed action instruction is a negated action instruction.

13. The computer-implemented method according to claim 1, wherein the features related to the proposed temporal instructions include features that support the one or more trained machine learning classifiers in determining a timeframe that the proposed action instruction is to be completed.

14. The computer-implemented method according to claim 1, wherein the computer-implemented method further includes:

computing, via a binary classification model, a binary classification inference that indicates whether the one or more electronic records includes at least one proposed action instruction, and based on determining that the binary classification inference indicates that the one or more electronic records includes the at least one proposed action instruction:
routing the first set of feature vectors and the second set of feature vectors to the one or more trained machine learning classifiers, and
computing, by the one or more trained machine learning classifiers, the first classification inference and the second classification inference based on the input of the first set of feature vectors and the second set of feature vectors.

15. The computer-implemented method according to claim 1, wherein the computer-implemented method further includes:
based on determining that the binary classification inference indicates that the one or more electronic records do not include the at least one proposed action instruction:
forgoing computing, by the one or more trained machine learning classifiers, the first classification inference and the second classification inference.

16. The computer-implemented method according to claim 1, wherein:
generating the structured digital artifact further includes:
generating a text input field, and
automatically inserting the textual representation of the set of instructions into the text input field, and
the plurality of distinct cells are responsive to user input.

17. The computer-implemented method according to claim 1, wherein:
the textual representation of the set of instructions corresponds to narrative text written by an author of the one or more electronic records, and
the narrative text describes one or more actions recommended by the author of the one or more electronic records.

18. The computer-implemented system according to claim 1, wherein selecting and setting the communication scheme attribute of the structured digital artifact includes:
searching for a lookup entry in a lookup data structure that lists optimal communication channels for the likely proposed action instruction type and the likely proposed temporal instruction,
extracting the optimal communication channels from the lookup entry,
determining that the one or more communication channels comprise a first communication channel that is included in the optimal communication channels and a second communication channel that is not included in the optimal communication channels,
adding the first communication channel to a communication preference parameter of the communication scheme attribute, and
forgoing adding the second communication channel to the communication preference parameter of the communication scheme attribute.

19. A computer-program product embodied in a non-transitory machine-readable storage medium storing computer instructions that, when executed by one or more processors, perform operations comprising:
at a remote service:
obtaining, from a memory device, one or more electronic records comprising an unstructured component, the unstructured component comprising a textual representation of a set of instructions;
extracting, by a feature extractor programmed to extract:
(a) a first set of feature vectors from the textual representation of the set of instructions, the first set of feature vectors comprising features related to a proposed action instruction, and
(b) a second set of feature vectors from the textual representation of the set of instructions, the second set of feature vectors comprising features related to a proposed temporal instruction;
computing, by one or more trained machine learning classifiers, a first classification inference that indicates a likely proposed action instruction type of a plurality of action instruction types based on an input of the first set of feature vectors;
computing, by the one or more trained machine learning classifiers, a second classification inference that indicates a likely proposed temporal instruction based on an input of the second set of feature vectors;
generating a structured digital artifact accessible via a graphical user interface based on (1) the first classification inference and (2) the second classification inference, wherein generating the structured digital artifact includes:
generating a cell-based container that includes a plurality of distinct cells;
automatically inserting one or more action tokens into at least a first cell of the plurality of distinct cells based on the likely proposed action instruction type;
automatically inserting one or more temporal tokens into at least a second cell of the plurality of distinct cells based on the likely proposed temporal instruction; and
in response to generating the structured digital artifact:
obtaining, from a computer database, one or more communication channels based on a record identifier associated with the one or more electronic records;
selecting and setting a communication scheme attribute of the structured digital artifact based on the one or more communication channels; and
automatically transmitting one or more electronic communications based on the communication scheme attribute of the structured digital artifact.

20. A computer-implemented system comprising:
one or more processors;
a memory;
a computer-readable medium operably coupled to the one or more processors, the computer-readable medium having computer-readable instructions stored thereon that, when executed by the one or more processors, cause a computing device to perform operations comprising:
at a remote service:
obtaining, from the memory, one or more electronic records comprising an unstructured component, the unstructured component comprising a textual representation of a set of instructions;
extracting, by a feature extractor programmed to extract:
(a) a first set of feature vectors from the textual representation of the set of instructions, the first set of feature vectors comprising features related to a proposed action instruction, and (b) a second set of feature vectors from the textual representation of the set of instructions, the second set of feature vectors comprising features related to a proposed temporal instruction;

computing, by one or more trained machine learning classifiers, a first classification inference that indicates a likely proposed action instruction type of a plurality of action instruction types based on an input of the first set of feature vectors;

computing, by the one or more trained machine learning classifiers, a second classification inference that indicates a likely proposed temporal instruction based on an input of the second set of feature vectors;

generating a structured digital artifact accessible via a graphical user interface based on (1) the first classification inference and (2) the second classification inference, wherein generating the structured digital artifact includes:

generating a cell-based container that includes a plurality of distinct cells;

automatically inserting one or more action tokens into at least a first cell of the plurality of distinct cells based on the likely proposed action instruction type;

automatically inserting one or more temporal tokens into at least a second cell of the plurality of distinct cells based on the likely proposed temporal instruction; and in response to generating the structured digital artifact:

obtaining, from a computer database, one or more communication channels based on a record identifier associated with the one or more electronic records;

selecting and setting a communication scheme attribute of the structured digital artifact based on the one or more communication channels; and automatically transmitting one or more electronic communications based on the communication scheme attribute of the structured digital artifact.

* * * * *